United States Patent [19]

Teraslinna

[11] Patent Number: 5,229,990
[45] Date of Patent: Jul. 20, 1993

[54] N+K SPARING IN A TELECOMMUNICATIONS SWITCHING ENVIRONMENT

[75] Inventor: Kari T. Teraslinna, Naperville, Ill.

[73] Assignee: AT&T Bell Laboratories, Murray Hill, N.J.

[21] Appl. No.: 592,103

[22] Filed: Oct. 3, 1990

[51] Int. Cl.$^5$ .................. H04J 3/26; H04L 12/56
[52] U.S. Cl. .................................. 370/60; 370/16; 370/14; 371/8.1; 371/11.1; 340/825.8
[58] Field of Search .............. 370/58.1, 60, 16, 14; 371/8.1, 8.2, 11.1, 11.2; 340/825.8

[56] References Cited

U.S. PATENT DOCUMENTS

| | | | |
|---|---|---|---|
| 3,805,039 | 4/1974 | Stiffler | 371/8.1 |
| 4,146,749 | 3/1979 | Pepping et al. | 179/15 AT |
| 4,566,102 | 1/1986 | Hefner | 371/11.1 |
| 4,654,842 | 3/1987 | Coraluppi et al. | 340/825.8 |
| 4,656,622 | 4/1987 | Lea | 370/60 |
| 4,700,340 | 10/1987 | Beranek et al. | 370/60 |
| 4,899,334 | 2/1990 | Shimizu | 370/60 |

FOREIGN PATENT DOCUMENTS 9007827 7/1990 World Int. Prop. O. .

OTHER PUBLICATIONS

V. P. Kumar et al. "Failure Dependent Performance Analysis of a Fault-Tolerant Multistage Interconnection Network", *IEEE Transactions on Computers*, vol. 38, No. 12, (Dec. 1989) pp. 1703–1712.

V. P. Kumar et al. "Augmented Shuffle-Exchange Multistage Interconnection Networks", *Computer*, (Jun. 1987) pp. 30–40.

B. Brunner et al. "A building-block VLSI chip for the Augmented Shuffle Exchange Network", revised preliminary data sheet (Mar. 1990), pp. 1–11.

*Primary Examiner*—Douglas W. Olms
*Assistant Examiner*—Min Jung
*Attorney, Agent, or Firm*—David Volejnicek

[57] ABSTRACT

An N+1 sparing strategy for both line circuits and switching nodes of a self-routing 3-stage Benes packet telecommunications network. Line circuits selectively serve either their own telecommunications line or the line normally served by the corresponding line circuit of the preceding row of the switching matrix. A row of spare line circuits and switching nodes is provided. Upon failure of a matrix internal node, line circuits modify packet addresses to reroute packets normally served by the failed node, or nodes below it within the same switching stage, to the next-lower row. Upon failure of a matrix edge node, line circuits of the failed node's row are disabled and line circuits of each row below it commence to serve the lines normally served by the preceding row. Active line circuits also modify packet addresses to reroute packets normally served by the last-stage node of the failed node's row, or rows below it, to the next-lower row. Upon failure of a line circuit, it is disabled and corresponding line circuits of each row below it commence to serve the lines normally served by the corresponding line circuit of the preceding row. Active line circuits also modify packet addresses to reroute packets normally switched to the failed line circuit or to the corresponding line circuits of the rows below it, to the corresponding line circuit of the next-lower row.

36 Claims, 9 Drawing Sheets

N+K SPARING IN A TELECOMMUNICATIONS SWITCHING ENVIRONMENT

TECHNICAL FIELD

This invention relates to fault-tolerant telecommunications systems, and specifically relates to N+K-type of sparing arrangements in switching networks of such systems.

BACKGROUND OF THE INVENTION

Reliability, and hence fault-tolerance, are of great concern in telecommunications systems. Various strategies have been devised over time to achieve fault tolerance in telecommunications systems.

Switching fabrics have commonly used the duplication strategy, wherein two switching fabrics are provided—one active and the other standby—and the standby fabric becomes active and takes over for the active fabric when the active fabric fails. However, such duplication is very expensive and inefficient in the use of total system resources, as only one half of the resources are used at any one time.

Recently, the art has seen the advent of so-called "self-healing" network topologies, which attempt to avoid full switching fabric duplication, by adding one or more switching stages within an integrated circuit that implements the switching fabric and relying on routing algorithms to find and create new paths through the network that bypass failed switching nodes. However, these topologies do not provide spare or idle units for the rerouted communications; instead, the rerouted communications add to existing communications on the new path. In telecommunication systems, trunks and switching fabric paths are typically engineered to run at upwards of 80% occupancy. Therefore, one path cannot support its own and another path's rerouted communications. Hence, the rerouting typically results either in losses of packetized communications or the dropping of calls. Furthermore, these topologies typically do not facilitate repair of the failed units, and consequently result in degradation of system performance over time. Since most of the self-healing networks rely on the use of small, "2×2", nodes that are packaged by the tens or hundreds to a board, switching communications from one node to another commonly does not serve to free a board for removal, replacement, and repair.

Tolerance of faults in line circuits (which interface the switching fabric to telecommunication lines, trunks, or other ports) has commonly been handled through line-circuit duplication and through N+K sparing strategies. The disadvantages of interface duplication are the same as of fabric duplication: expense and inefficiency. N+K sparing avoids duplication, by providing some number K of spare standby units that can be substituted for failed ones of the active N units. But, in the past, it has failed to eliminate the disadvantages of duplication, because N+K sparing has traditionally required the use of an additional separate and dedicated switching network, such as a network of multiplexers, along with extensive additional wiring, to reroute communications from failed units to the spare units. Hence, savings gained by avoidance of line-circuit duplication have been lost through inclusion of the rerouting network.

SUMMARY OF THE INVENTION

This invention is directed to solving these and other disadvantages of the prior art. Generally according to the invention, presented is an N+K sparing arrangement for telecommunications switching systems, that provides fault tolerance in case of either switching-fabric and/or line-circuit failure, and that does so without use of a separate and dedicated rerouting network. Specifically according to the invention, in a telecommunications switching system having a plurality of switching nodes interconnected to form switching stages and rows of a switching matrix, there is included at least one normally-spare row of normally-spare nodes. The nodes of the matrix route received telecommunications through the switching matrix, but additionally there are provided means responsive to a signal that identifies an individual node (e.g., a failed node) of an individual row other than the spare row, which means take telecommunications that are normally received by the individual node and re-route them to a node both of the same stage as the individual node and not of the spare row. These means further take telecommunications normally received by any node to which telecommunications are being re-routed, and in turn re-route them to yet another node of the same stage as the individual node. This eventually involves taking telecommunications normally received by one of the nodes to which telecommunications are being re-routed, and re-routing them to a node of both the same stage as the individual node and of the spare row. Telecommunications that are normally received by a whole series of nodes are thereby shifted away from the individual node and toward the spare node of the same stage. The result is that the new capacity needed due to the bypassing of a failed node is provided by a spare, normally idle, node.

In an illustrative embodiment of the invention, the re-routing means take telecommunications that are normally received by any one of (a) the individual node and (b) nodes of both a same stage as the individual node and of rows on a same side of (e.g., preceding or succeeding) the individual row in a sequence of the rows as the spare row, and instead route those telecommunications to a node of both the same stage as the individual node and a row on the same side of the row that includes the one node. Illustratively, the node to which the one node's telecommunications are shifted is adjacent in the sequence on the same side (e.g., previous or next) to the row that includes the one node. A shifting protection strategy is thus effected, whereby processing is shifted in the network, in a whole sequence of nodes that lie to one side of the failed node, away from the failed node of a stage and toward a spare node of that stage.

The same type of shifting protection strategy is followed with respect to line circuits. In the switching system having a plurality of line circuits connected to nodes of the switching matrix rows and included in those rows, the normally-spare row includes normally-spare line circuits. Each line circuit interfaces communications that it receives between a communications line and the connected nodes. Means are provided that are responsive to a signal identifying an individual line circuit (e.g., a failed line circuit) of an individual row other than the spare row, which means take telecommunications that are normally received by the individual line circuit and re-route them to another line circuit which is not of the spare row. These means further take telecommunications normally received by any line circuit to which telecommunications are being re-routed, and in turn re-route them to yet another line circuit. This eventually involves taking telecommunications normally received by one of the line circuits to which telecommunications are being re-routed, and re-routing them to a line circuit of the spare row. Telecommunications that are normally received by a whole series of line circuits are thereby shifted away from the individual line circuit and toward the spare line circuits. Illustratively, the shifting is done between line circuits of different rows, as opposed to line circuits of the same row, and is preferably done among line circuits that occupy corresponding positions within the different rows, i.e., that all correspond to the individual line circuit in the sequence of line circuits formed by the line circuits of each row.

In an illustrative embodiment of the invention, the re-routing means take telecommunications that are normally received by any one of (a) the individual line circuit of the individual row and (b) individual line circuits of rows on the same side of the individual row in the sequence as the spare row, and instead route those telecommunications to another line circuit corresponding to the individual line circuit in the sequence formed by the line circuits of each row, of a row adjacent in the sequence on the same side to the row that includes the one line circuit. A shifting protection strategy is thus effected in the network, in a whole series of line circuits belonging to rows that lie to one side of the failed line circuit's row, away from the failed line circuit and to a line circuit of the spare row.

While the above-characterized node-shifting strategy is sufficient for N+K sparing for nodes of internal stages of the switching matrix, a form of the line-circuit shifting strategy is advantageously employed for N+K sparing for nodes of edge stages of the switching network. Edge stages are those directly connected to the line circuits. In this sparing arrangement, means are provided that are responsive to a signal identifying an individual node of an edge stage of an individual row other than the spare row, which means take telecommunications that are normally received by the line circuits of the individual row and re-route them to line circuits of a row other than the individual row and other than the spare row. These means further take telecommunications normally received by any line circuit to which telecommunications are being re-routed, and in turn re-route them to line circuits of yet another row. This eventually involves taking telecommunications normally received by line circuits of one of the rows to which telecommunications are being re-routed, and re-routing them to the line circuits of the spare row. Telecommunications that are normally received by a whole series of row's line circuits and edge nodes are thereby shifted away from those row's line circuits and edge nodes and toward the spare row's line circuits and edge nodes.

In an illustrative embodiment of the invention, the re-routing means take telecommunications that are normally received by any one of (a) line circuits of the individual row and (b) line circuits of rows on the same side of the individual row in the sequence as the spare row, and instead route those telecommunications to line circuits of a row on the same side of the row that includes the one node. A shifting protection strategy is thus effected, whereby processing is shifted in the network, in a whole sequence of edge nodes and their connected line circuits that lie in rows to one side of the failed edge node, away from the failed node and its line circuits and to the line circuits and nodes of the spare row.

Illustratively, rerouting of communications at the inputs and outputs of the switching system, between line circuits, is done by connecting individual line circuits to two telecommunications links—one which is normally served by the line circuit and a second one which is normally served by another line circuit—and causing the line circuit selectively to serve one or the other of the links.

The shifting arrangements characterized above are particularly suited for implementation in self-routing networks. Self-routing networks are packet switching networks that use information carried by the packets themselves to route the packets therethrough. They are becoming the standard networks for broadband, BISDN, fast packet, frame relay, and other forms of packetized communications. The above-characterized arrangements are particularly suited for implementation in self-routing networks because rerouting of a self-routing telecommunication packet from one node to another within the switching matrix may be accomplished by the simple expedient of modifying (e.g., incrementing) the packet's included routing address prior to transmittal of the packet into the matrix. The address modification is easily performed by circuitry included in the line circuits.

These and other advantages and features of the present invention will become apparent from the following description of an illustrating embodiment of the invention taken together with the drawing.

DETAILED DESCRIPTION

Figure 1:
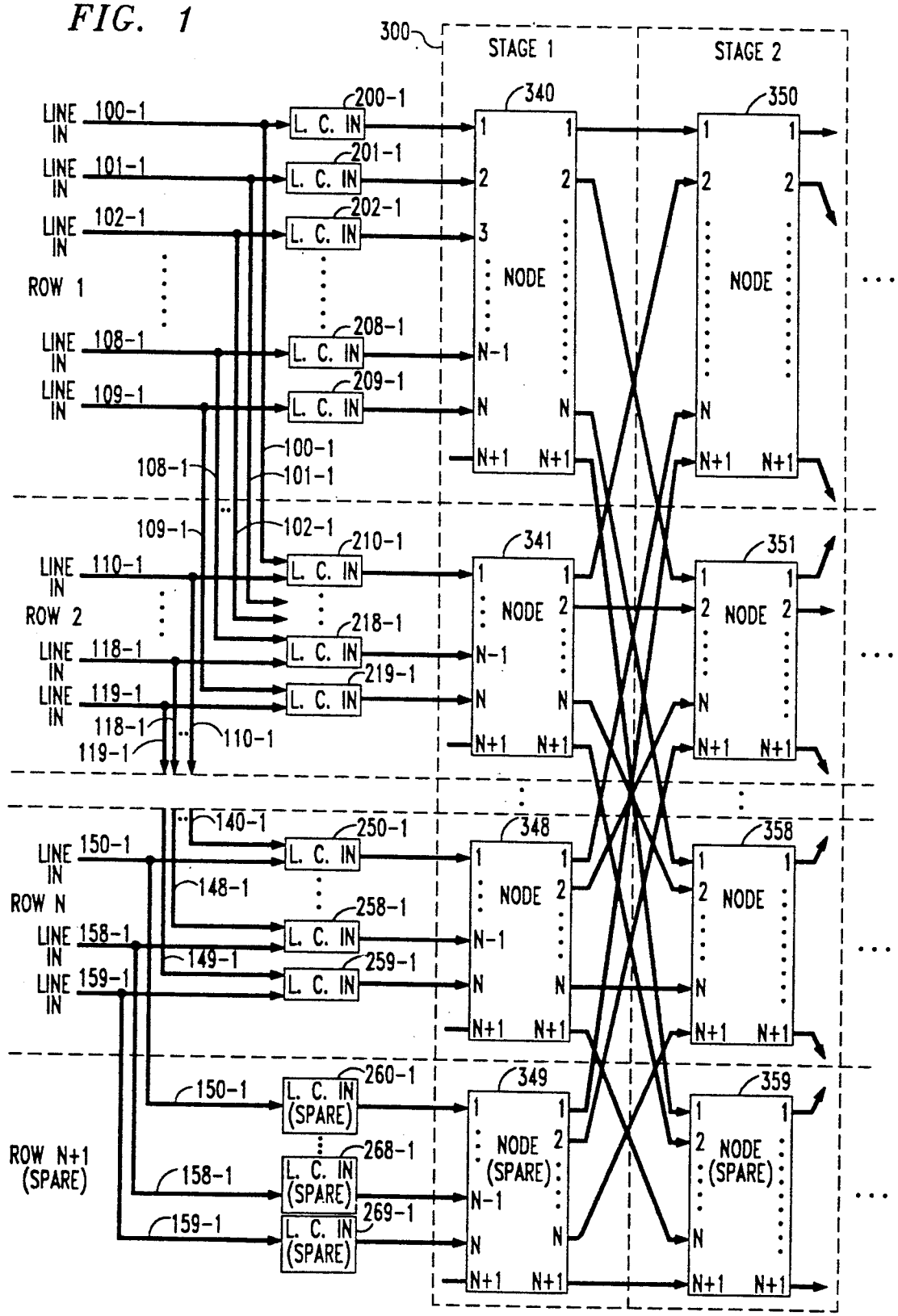
FIGS. 1 and 2 are a block diagram of a switching system of a self-routing network which incorporates a first illustrative embodiment of the invention.
Figure 2:
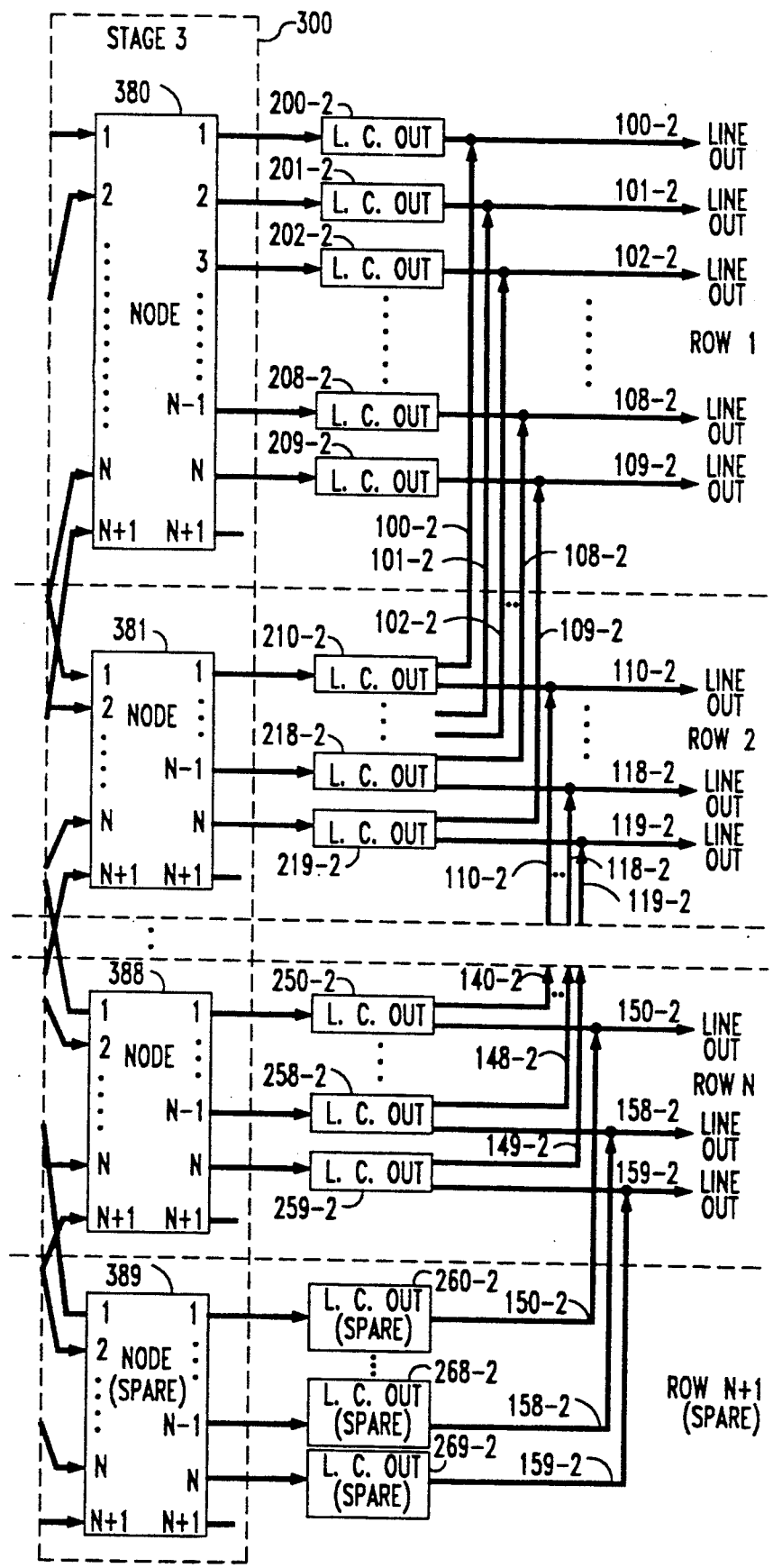
Figure 3:
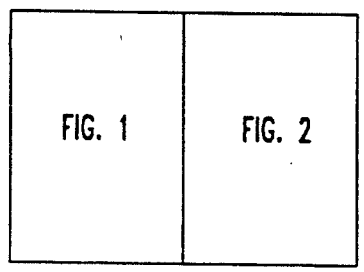
FIG. 3 shows the arrangement of FIGS. 1 and 2 to form a single diagram.

FIGS. 1 and 2 show in block diagram form an illustrative switching system of a self-routing telecommunications system. The switching system comprises a switching network 300 having a plurality of switching nodes 340 to 389 arranged into a matrix, and a plurality of line (or trunk) circuits 200 to 269 which interface switching network 300 to telecommunication lines 100 to 159. Lines 100 to 159 are bidirectional, and so are line circuits 200 to 269. But for purposes of ease of illustration, lines 100 to 159 have been shown separated into their incoming components 100-1 to 159-1 and outgoing components 100-2 to 159-2, and line circuits 200 to 269 have also been shown separated into their incoming components 200-1 to 269-1 and outgoing components 200-2 to 269-2.

Switching network 300 has a conventional configuration—that of a 3-stage Benes network. Such networks are becoming the standard networks for broadband packet communications. Nodes 340 to 389 are arranged into a regular matrix of rows 1 to (N+1) and columns, or stages, 1 to 3. Each node 340 to 389 is a symmetrical switching node having (N+1)inputs and (N+1)outputs—(N+1)equal to 32 being common in the industry. Nodes 340 to 389 are conventional self-routing network nodes. Each receives at its inputs packets that carry their own destination address information. A node examines the address information of each received packet and, based on that information, routes the packet to one of its outputs.

According to the invention, fault-tolerance is achieved in the switching system of FIG. 1 through an "N+1" type of sparing arrangement. That is, within the sequence of rows 1 to (N+1), only switching nodes of rows 1 to N are normally active and switching packetized traffic, while nodes of row (N+1) are normally spare and are used only when a fault incapacitates a unit of one of the rows 1 to N. Since nodes of row (N+1) are normally not used, and since these nodes are connected to only the last one input and/or output of each node of rows 1 to N, the functional size of each node 340-389 is reduced, for purposes of normal operation, to N×N. The last, (N+1)th, inputs of nodes 340 to 349 of the first stage 1 are left unconnected, as are the last, (N+1)th, outputs of nodes 380-389 of the last stage 3.

Further according to the invention, line circuits 210 to 259 of rows 2 to N are each connected to a pair of lines 100 to 159: a line which the one line circuit serves during normal operation, and a line that is normally served by the corresponding line circuit of the preceding row (i.e., by a line occupying the same position within the sequence of line circuits of the preceding row as the one line circuit occupies within the sequence of line circuits of its own row). The output portions 100-2 to 159-2 of each line 100 to 159 are each tied to the outputs of two line circuits 210 to 259 through a logical-OR connection. Line circuits 100 to 109 of row 1 are each connected only to the one line 100 to 109, respectively, which it normally serves. Line circuits of row (N+1) are each connected only to the one line 150 to 159 which is normally served by the corresponding line circuit of the preceding row N. Consequently, just like the nodes of row (N+1), line circuits 260 to 269 of row (N+1) are spares, used only when a fault incapacitates a unit of one of the rows 1 to N.

Figure 6:
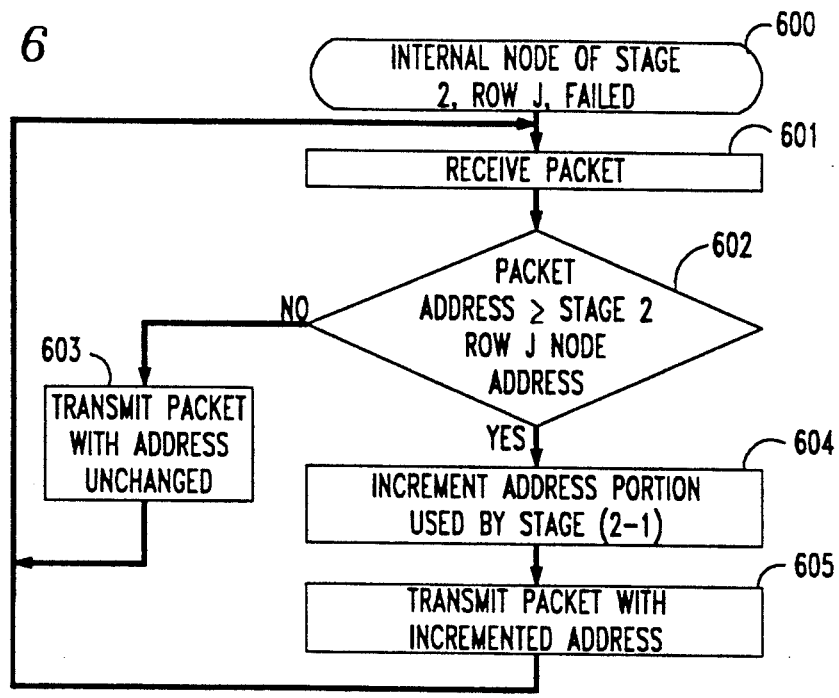
FIG. 6 shows in flow form the functions performed upon failure of an internal node of the system of FIGS. 1 and 2.

The response of the system of FIG. 1 to a failure of an internal node is shown in FIG. 6. In operation, when a failure of a node of an internal switching stage (i.e., stage 2) is detected, line circuits 200 to 259 of rows 1 to N are notified, at step 600, illustratively by a controller (not shown) of the switching system of FIG. 1. The notification identifies the intermediate stage 2 and the one of the rows 1 to N in which the failed node is located. Then, when an input portion 200-1 to 259-1 of a line circuit 200 to 259 receives a packet, at step 601, it examines that portion of the addressing information carried by the incoming packet which is used by nodes of the stage that precedes the stage which contains the failed node, to determine if that address portion will result in the packet being routed to the row which contains the failed node, or any row below that, at step 602. If not, the packet is processed normally by the input portion of the line circuit, at step 603; if so, the input portion of the line circuit changes the subject portion of the packet's addressing information to cause the packet to be rerouted to the next-lower row, at step 604, and then continues with normal processing of the packet, at step 605.

For example, if node 351 of row 2 and stage 2 fails, line circuits 200 to 259 check that portion of the address of each incoming packet that is used by nodes 340 to 348 of stage 1. If the packet will be routed by a stage 1 node to node 350 of row 1, the packet is processed normally and is sent into switching network 300 with its address unchanged. But if the packet will be routed by a stage 1 node to any one of the nodes 351 to 358 of rows 2 through N, the line circuit changes the packet's address to cause the packet to be rerouted by the stage 1 node to the stage 2 node of the next-lower row. Thus, packets normally sent to node 351 of stage 2 row 2 will be sent to the node of stage 2 row 3; packets normally sent to the node of stage 2 row 3 will be sent to the node of stage 2 row 4; and so on. Finally, packets normally sent to node 358 of stage 2 row N will be sent to node 359 of stage 2 row (N+1). A shifting protection strategy is thus implemented, whereby processing is shifted in the network away from the failed node of a stage and to the spare node of that stage.

Figure 7:
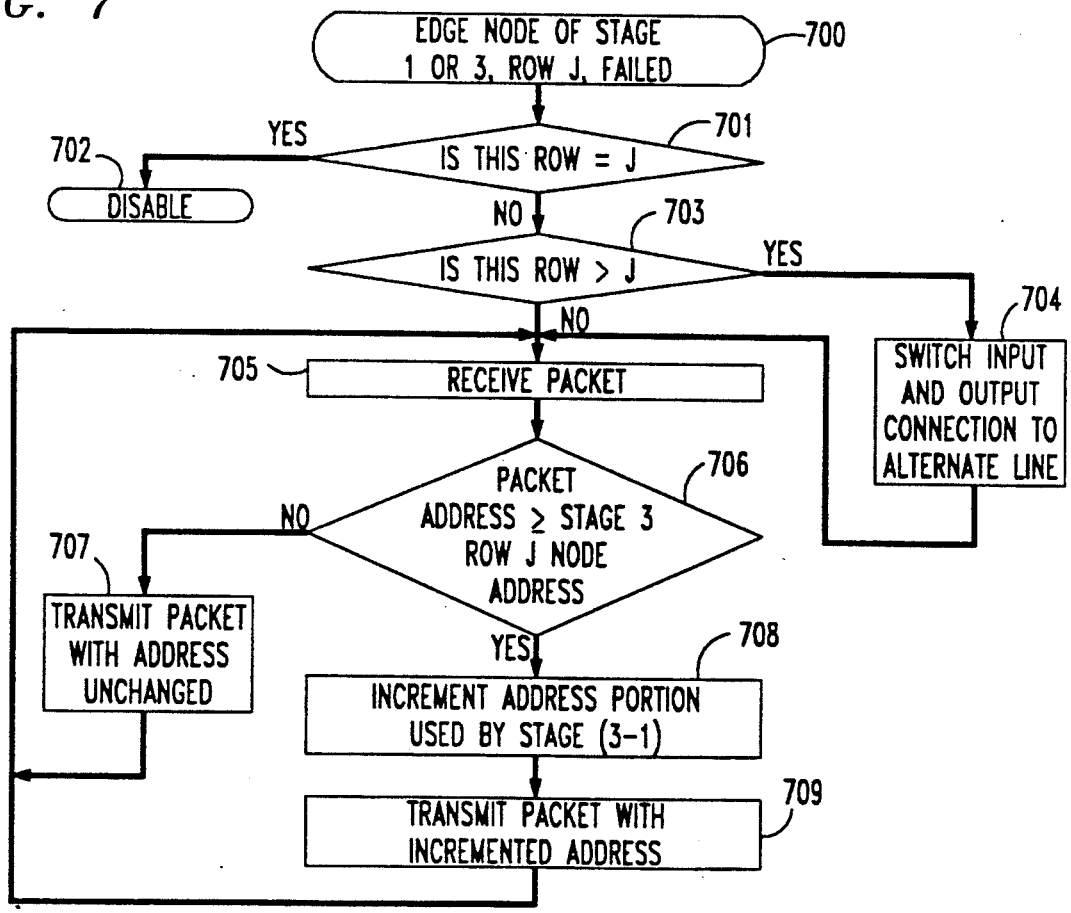
FIG. 7 shows in flow form the functions performed upon failure of an edge node of the system of FIGS. 1 and 2.

The response of the system of FIG. 1 to a failure of an edge node is shown in FIG. 7. When a failure of a node of an edge stage (i.e., of stage 1 or 3) is detected, line circuits 200 to 269 of rows 1 to (N+1) are notified, at step 700. The notification identifies the one of the rows 1 to N which failed, i.e., in which the failed node is located. The line circuits serving the failed row are disabled, at steps 701 to 702, and the line circuits serving all rows below the failed one are caused to switch their input and output connections from the line which they normally serve to the line that is normally served by the corresponding line circuit of the preceding row, at steps 703 to 704. As a result, line circuits 260 to 269 which serve row (N+1) become activated. Then, when an input portion 200-1 to 269-1 of an active one of line circuits 200 to 269 receives a packet, at step 705, it examines that portion of the addressing information carried by the incoming packet which is used by nodes of the next-to-last stage (3-1, or 2), to determine if that address portion will result in the packet being routed to the failed row or any row below that, at step 706. If not, the packet is processed normally by the input portion of the line circuit, at step 707; if so, the input portion of the line circuit changes the packet's addressing information to cause the packet to be rerouted by the stage (3-1, or 2) node to the next lower row, at step 708, and then continues with normal processing of the packet, at step 709.

For example, if either stage 1 node 341 or stage 3 node 381 of row 2 fails, line circuits 200 to 209 of row 1 continue serving lines 100 to 109, respectively, while line circuits 210 to 219 of row 2 become disabled, and line circuits of rows 3 to (N+1) begin to serve lines formerly served by line circuits of rows 2 to N, respectively. Line circuits of rows 1 and 3 to (N+1) then check that portion of the address of each incoming packet that is used by nodes of stage 2. If the packet will be routed by a stage 2 node to node 380 of stage 3 row 1, the packet is processed normally and is sent into the switching network with its address unchanged. But if the packet will be routed by a stage 2 node to any one of the stage 3 nodes 381–389 of rows 2 to N, the line circuit changes the address to cause the packet to be rerouted by the stage 2 node to the stage 3 node of the next-lower row. Thus, packets normally sent to node 381 of stage 3 row 2 will be sent to the node of stage 3 row 3; packets normally sent to the node of stage 3 row 3 will be sent to the node of stage 3 row 4; and so on. Finally, packets normally sent to node 388 of stage 3 row N will be sent to node 389 of stage 3 row (N+1). A shifting protection strategy is thus implemented, whereby processing is shifted in the network away from the failed node of an edge stage and to the spare node of that stage.

Figure 8:
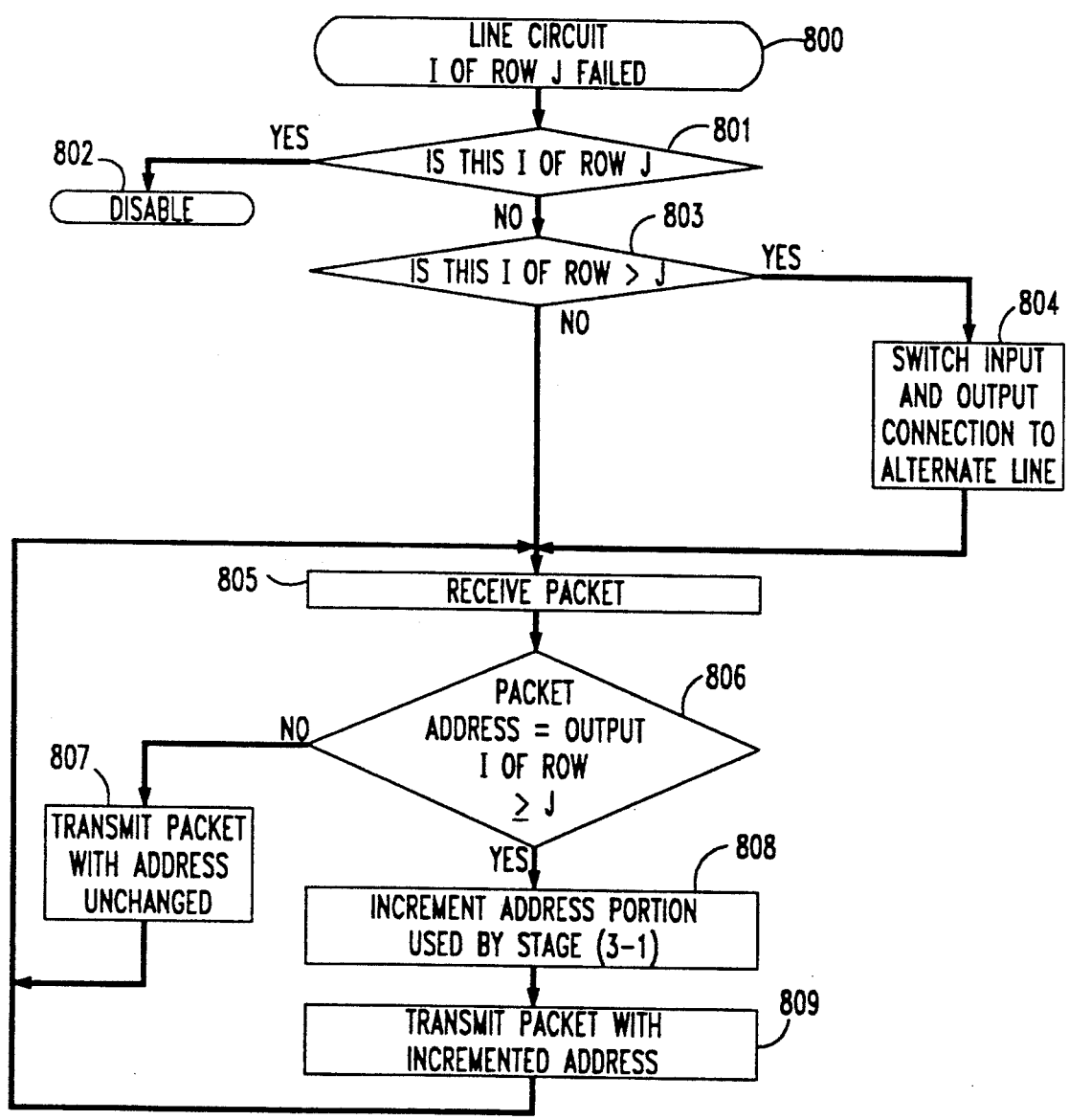
FIG. 8 shows in flow form the functions performed upon failure of a line circuit of the system of FIGS. 1 and 2.

The response of the system of FIG. 1 to a failure of a line circuit is shown in FIG. 8. When failure of a line circuit is detected, the line circuits 200 to 269 are notified, at step 800. The notification identifies the network address that results in packets being routed to the output portion of the failed line circuit. The failed line circuit is disabled, at steps 801 to 802, and the corresponding line circuits serving all rows below the one that includes the failed line circuit are caused to switch their input and output connections from the line which they normally serve to the line that is normally served by the corresponding line circuit of the preceding row, at steps 803 to 804. As a result, one of the line circuits 260 to 269 which serve row (N+1) becomes activated. Then, when an input portion 200-1 to 269-1 of an active one of line circuits 200 to 269 receives a packet, at step 805, it examines that portion of the addressing information carried by the incoming packet which is used by nodes of the last stage 3, to determine if that address portion will result in the packet being routed to the line circuit position that was affected by the fault in either the row which contains the failed line circuit or any row below that, at step 806. If not, the packet is processed normally by the input portion of the line circuit, at step 807; if so, the input portion of the line circuit changes the portion of the packet's addressing information that is used by nodes of the preceding stage (3-1, or 2), to cause the packet to be rerouted to the next-lower row, at step 808, and then continues with normal processing of the packet, at step 809.

For example, if line circuit 208 fails, line circuits 200 to 207, 209 to 217, 219 . . . 250 to 257, and 259, continue to serve lines 100 to 107, 109 to 117, 119 . . . 150 to 157, and 159, respectively. But line circuit 208 becomes disabled, line circuit 218 begins to serve line 108, line 118 begins to be served by a line circuit of row 3, line circuit 258 begins to serve line 148 of row (N−1), and line circuit 268 begins to serve line 158. Line circuits 200 to 207, 209 to 259, and 268 then check the address of each incoming packet. If the packet will not be routed by switching network to line circuit 208, 218 . . . or 258, it is processed normally and is sent into the switching network with its addressing information unchanged. But if the packet will be routed to line circuit 208, 218 . . . or 258, the line circuits change the address to cause the packet to be rerouted by nodes of stage 2 to the stage 3 node of the next-lower row. Thus, packets normally sent to line circuit 208 will now be sent to line circuit 218, packets normally sent to line circuit 218 will now be sent to a line circuit of row 3, packets normally set to a line circuit of row (N−1) will now be sent to line circuit 258, and packets normally sent to line circuit 258 will now be sent to line circuit 268. A shifting protection strategy is thus implemented, whereby processing is shifted in the network away from the failed line card and to the corresponding line card of the spare row.

Figure 5:
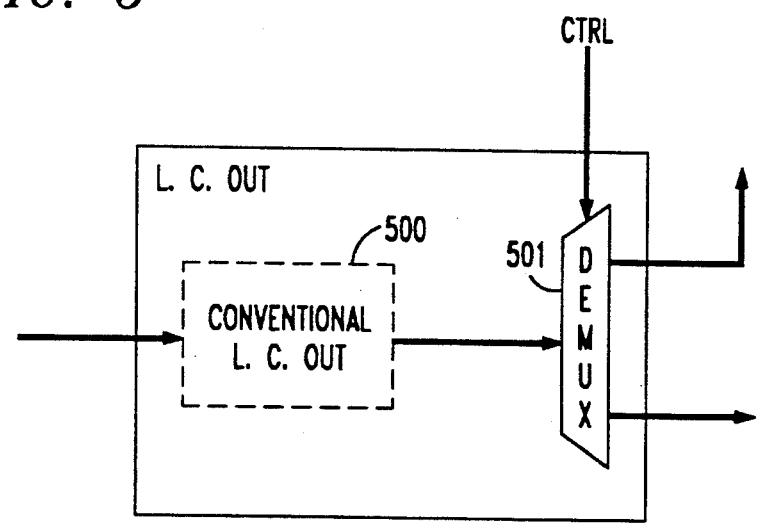
FIG. 5 is a block diagram of an output portion of a line circuit of FIGS. 1 and 2.
Figure 4:
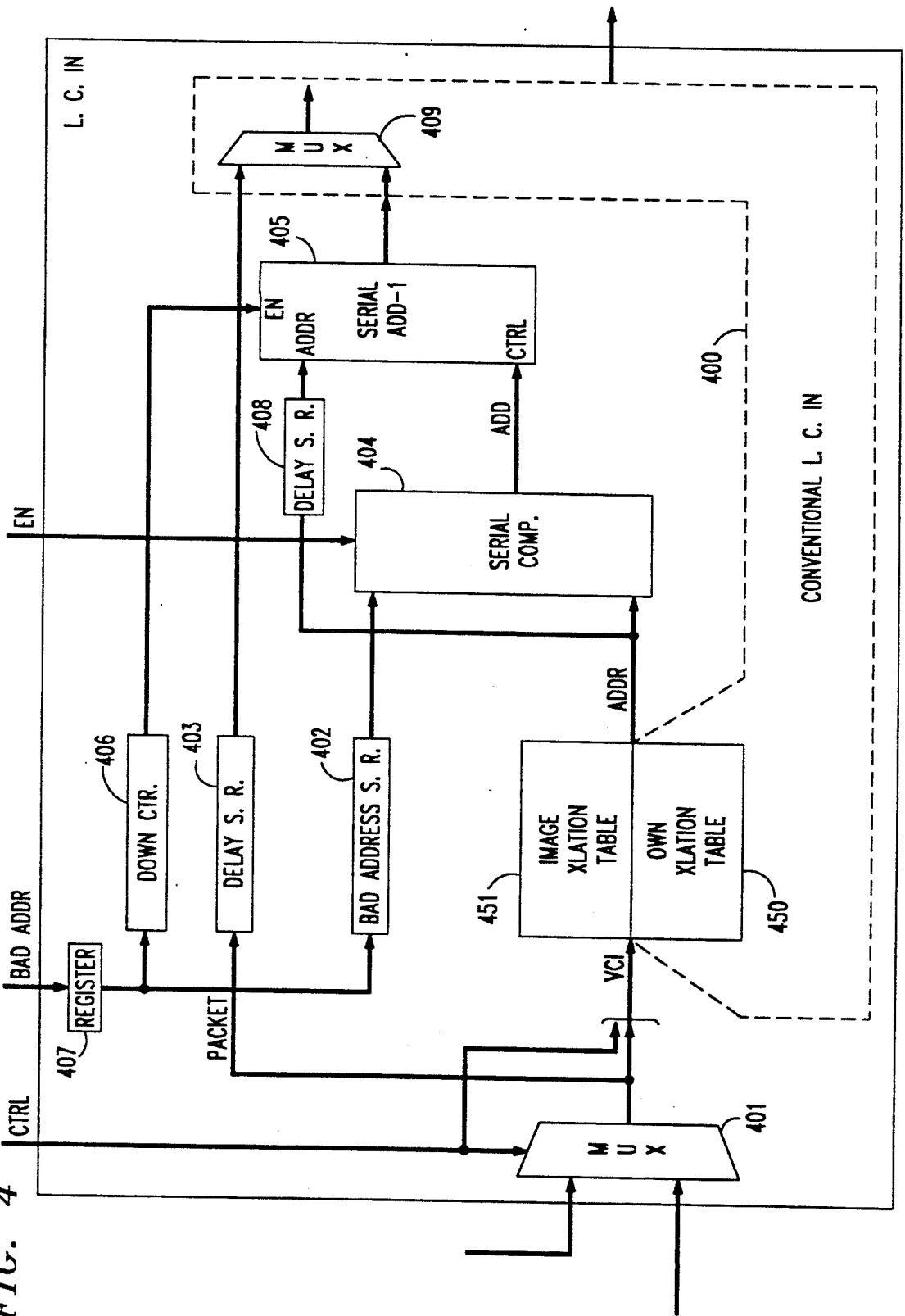
FIG. 4 is a block diagram of an input portion of a line circuit of FIGS. 1 and 2.

In order to illustrate how the line circuits accomplish the above-described functionality, attention is called to FIGS. 4 and 5. FIG. 4 shows a block diagram of the input portion of a representative line circuit of the system of FIG. 1. The input portion includes a conventional line circuit input portion 400. In systems where packets do not include physical addresses which define their route through the switching system of FIG. 1, but instead include logical addresses, such as Virtual Circuit Identifiers (e.g., VCIs of ATM cells), conventional line circuit input portion 400 includes its own translation table 450 for converting the VCIs into the requisite physical addresses. Translation table 450 is addressed by VCIs carried in headers of packets incoming from the line normally served by the line circuit, and outputs the corresponding physical addresses. In systems where packets do include the requisite physical addresses, translation table 450 is not needed.

According to the invention, in systems where packets do not include physical addresses, input portions 210-1 to 259-1 of line circuits 210 to 259 also each include an image translation table 351. Table 351 is merely a copy, an image, of translation table 350 of the corresponding line circuit of the preceding row, i.e., of the line circuit that normally serves the second line which is connected to the subject line circuit. Line circuits 200 to 209 of row 1 do not need image translation table 351, while line circuits 260 to 269 of row N+1 do not need own translation table 350. In systems where packets include physical addresses, image translation tables 351 also are not needed.

At each one of the input portions 210-1 to 259-1 of line circuits 210 to 259, the pair of input lines that are connected thereto are connected to inputs of a selector multiplexer 401. At each one of the line circuits 200 to 209 and 260 to 269, the one connected input line is connected to one of the multiplexer 401 inputs, while the other input remains unconnected. Multiplexer 401 selects one of its inputs for connection to its output under control of an externally-supplied signal received over a CTRL signal line. In systems where packets do not include physical addresses, CTRL signal line and the output of multiplexer 401 are connected to an address input of translation tables 450 and 451. The output of multiplexer 401 delivers to tables 450 and 451 the VCI, which acts as an offset pointer into tables 450 and 451, while the signal on CTRL line acts as a most-significant address bit and selects one or the other of the tables 450 and 451. In systems where packets include physical addresses, the output of multiplexer 401 is connected directly to an ADDR input of a serial comparator 404, described further below.

In all line circuits 200-269, a bad address shift register 402 is used to identify a node 340-389 or line circuit 200-259 to which routing of packets is to be avoided, while a down counter 406 is used to identify the portion of the physical address of a packet that must be modified in order to avoid routing to the bad node or line circuit. The address and count are loaded into shift register 402 and down counter 406 for each incoming packet from a register 407. Register 407 is programmed externally over a BAD ADDR bus. Shift register 402 and down counter 406 are synchronized, so that a positive count of down counter 406 decrements by one for each address bit output by register 402.

In all line circuits 200-269, a serial output of bad address shift register 402 is connected to a serial input of serial comparator 404. In systems where packets do not include physical addresses, the serial address output of translation tables 450 and 451 is connected to a second serial input of serial comparator 404. In systems where packets include physical addresses, comparator 404 receives those addresses at its second serial input directly from the output of multiplexer 401. The outputs of shift register 402 and either translation tables 450 and 451 in the one case, or multiplexer 401 in the other case, are synchronized to simultaneously supply corresponding bits of addresses to comparator 404. Serial comparator 404 compares the addresses received at its two inputs to determine if the packet address will result in routing of the packet to the node or line circuit addressed by the bad address, or to a node below the addressed node in the same stage, or to a corresponding line circuit in a row below the one containing the bad line circuit. Illustratively, comparator 404 compares the incoming addresses bit-by-bit, to determine whether the address provided by multiplexer 401 or tables 450 or 451 is equal to or greater than the address provided by bad address shift register 402. If so, comparator 404 generates an ADD signal at its output.

In all line circuits 200 to 269, the output of down counter 406 is connected to an enable (EN) input of a serial add-1 circuit 405, and the ADD signal output of serial comparator 404 is connected to a control (CTRL) input of circuit 405. The physical address of the packet is connected to an address (ADDR) input of circuit 405. The latter connection is through a delay shift register 408, which delays propagation of the incoming address to circuit 405 in order to provide time for comparator 404 to perform its function, and thereby synchronize the ADDR and CTRL inputs of circuit 405. If an ADD signal is not received by circuit 405 for an incoming packet, circuit 405 merely passes the address that it received at its address input to its output, and sends it to conventional line circuit input portion 400. But if an ADD signal is received by circuit 405 for the incoming packet, circuit 405 waits for the count of down counter 406 to reach zero. When the count does reach zero, it is an indication that circuit 405 is commencing to receive that portion of the packet's routing address which must be modified, and circuit 405 responds by incrementing that address portion by adding one to that address portion, and passes the incremented address to conventional line circuit portion 400. There is one routing address portion for each stage of switching. In the present illustrative example where each node 340 to 389 has 32 outputs, each routing address portion is five bits long. The last output of a node 340 to 389 is addressed by a routing address portion having bit values of all ones. However, the last output of a node is not used except for sparing. It follows, therefore, that a routing address portion having bit values of all ones will never be received by circuit 405, but will only be selectively created by circuit 405. Consequently, no carry, no overflow, from one routing address portion to another will occur as a consequence of a routing address portion being incremented by circuit 405.

In each of line circuits 200 to 269, the output of multiplexer 401 is also connected to the serial input of a delay shift register 403. Shift register 403 merely delays propagation of an incoming packet through the line circuit in order to provide time for translation tables 450 and 451, if any, and comparator 404 and serial add-1 circuit 405 to perform their functions. The serial output of delay shift register 403 is connected to one input of a multiplexer 409, while the output of circuit 405 is connected to a second input of multiplexer 409. Included in conventional line circuit portion 400, multiplexer 409 prepends the address received from serial add-1 circuit 405 to the packet received from delay shift register 403.

FIG. 5 shows a block diagram of the output portion of a representative line circuit. The output portion includes a conventional line circuit output portion 500 whose output is connected to the input of a demultiplexer 501. Demultiplexer 501 is the inverse of multiplexer 401 of FIG. 4 and is controlled by the same CTRL signal line.

Figure 9:
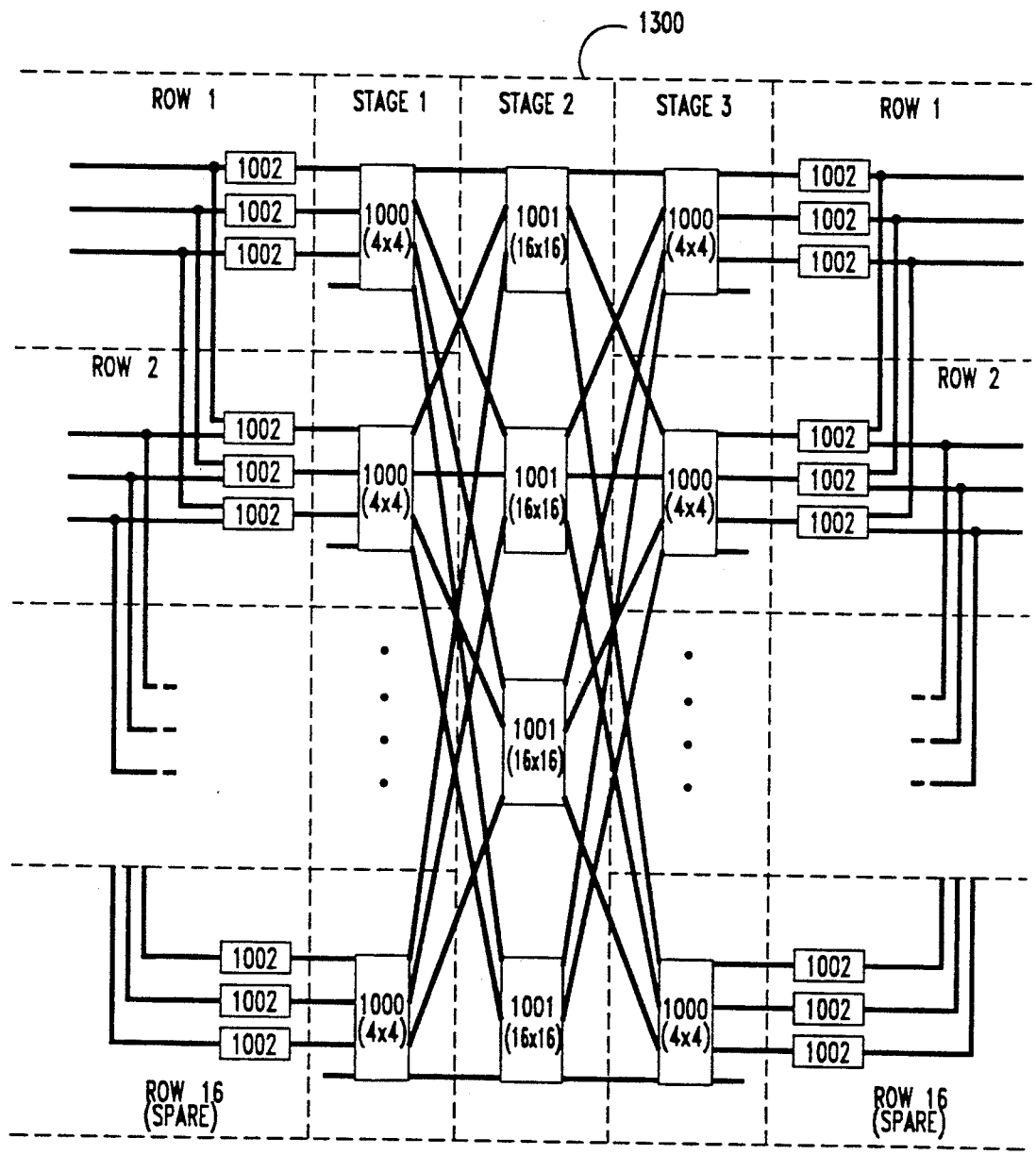
FIG. 9 is a block diagram of a second illustrative switching system of a self-routing network which incorporates an embodiment of the invention.

FIG. 9 portrays in block diagram form an alternative implementation of a switching network of a telecommunications system, which shows an alternative implementation of the invention. The figure illustrates how the invention can be applied in a more general Benes network where the different columns have both a different number of nodes and different sizes of nodes. Both the Benes and Clos networks can be built in this way without requiring uniform numbers or sizes of nodes in each column. The figure shows a 3-stage Benes network 1300 having 16 rows, the last one being a spare row. The edge stages are made up of "4×4" square nodes 1000 while the internal stage is made up of "16×16" square nodes 1001. The first three inputs and outputs of nodes 1000 of edge stages 1 and 3 are connected to line circuits 1002, while the fourth inputs of nodes 1000 of the first stage and the fourth outputs of nodes 1000 of the last stage are left unconnected, unused. The interconnections of line circuits 1002 are the same as those in FIGS. 1 and 2. To keep the drawing from becoming unduly cluttered, not all communication links, line circuits 1002, and interconnections are shown.

In FIG. 9, each of the sixteen "4×4" nodes 1000 of the first stage are linked to each of the four "16×16" nodes 1001 of the second stage. The connections between the second stage and the third stage are a mirror image of the links between the first and the second column. This generalization to non-uniform node sizes with non-uniform numbers of nodes in each stage does not alter the algorithms illustrated in FIGS. 6, 7 and 8. Only the size of the address field for each stage changes in size to what is necessary to code all the outputs. Thus, each "4×4" node 1000 would require a 2-bit address field and each "16×16" node 1001 would require a 4-bit address field to determine which of the outputs an input is to be routed to.

The 3-stage network of FIG. 9 can be expanded to a 5-stage network recursively as follows. The only requirement for each of the nodes of FIG. 9 is that they be non-blocking. Thus, each of the "16×16" nodes 1001 can be replaced by the non-blocking 3-stage Benes subnetwork 1100 shown in FIG. 10. Each subnetwork 1100 is made entirely with 4 rows of "4×4" nodes 1000 arranged in three stages. With this replacement done, the resulting network contains 5 stages, and each stage has 16 nodes 1000 of size "4×4". This is a 5-stage Benes network; a Clos network is grown in a similar fashion, except that, in a Clos network, the nodes are not "square" (do not have the same number of inputs and outputs). In either case, the entire subnetwork 1100 that has replaced the last node 1001 in the internal stage of FIG. 9 is considered a spare subnetwork 1100. Each "16×16" subnetwork 1100 requires a 6-bit address field because each of the 3-stages requires a 2-bit address.

If any node in any "16×16" subnetwork 1000 fails, then the first stage nodes employ the shift strategy as described above to reroute communication to the next "16×16"]subnetwork 1100 below the subnetwork 1100 containing the failed node, as for FIG. 9. The communications traversing each "16×16" subnetwork 1100 below the failed node have their communications transferred to the subnetwork 1100 just below, just like before.

However, a complication arises if either a line circuit or a first or a last stage node 1000 fails and a "16×16" subnetwork 1100 must perform a shift-down function. Rerouting the communications within the 3-stages of a "16×16" subnetwork 1100 may result in conflicts (blocking) if the addresses of the fourth stage (the last stage of FIG. 10) are shifted, unless a Benes routing algorithm is run to determine the address that the second stage (i.e., the first stage of FIG. 10) must use to re-route its communications. To simplify the rerouting algorithm, some increase in the complexity of the "16×16" subnetwork 1100 is needed. This is a classic tradeoff: adding more crosspoints and paths reduces the complexity of the path hunt algorithm. The resulting 5-stage network is a modified Benes network, wherein a modified "16×16" subnetwork 1200 shown in FIG. 11 replaces at least each of the non-spare "16×16" nodes 1001 of FIG. 9. A comparison of the subnetwork 1200 of FIG. 11 with subnetwork 1100 of FIG. 10 reveals that subnetwork 1200 differs from subnetwork 1100 in that each node in the edge stages has become a "4×5" or a "5×4" node 1201 (instead of a "4×4" node 1000) and has a spare path through an additional and normally-unused fifth center stage node 1000.

Figure 11:
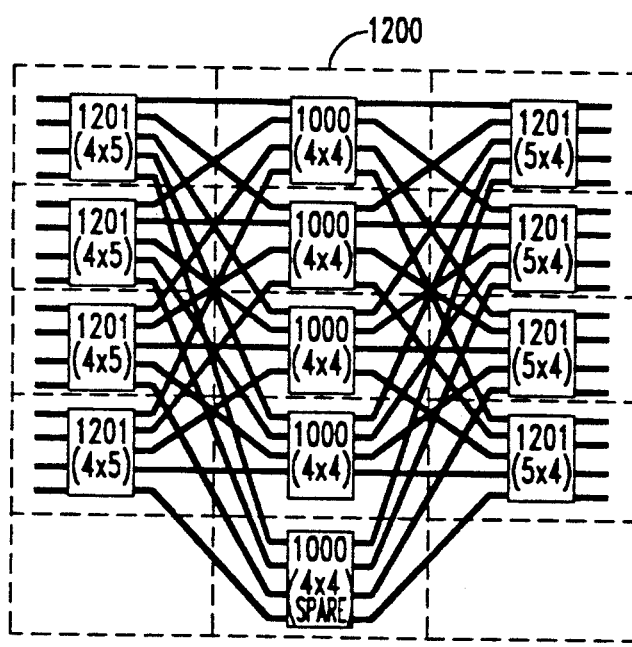
FIG. 11 is a block diagram of a second alternative implementation of a node of the center stage of the system of FIG. 9.

The addressing through subnetwork 1200 of FIG. 11 is done as follows. The whole subnetwork 1200 has 16 outputs to be addressed, so a 4-bit address is necessary to address these outputs. The high-order 2 address bits are used by the center stage and the low-order 2 address bits are used by the last stage of FIG. 11. An additional 3-bit address is conventionally assigned to the first stage of FIG. 11 based on a Benes routing algorithm. It is used strictly for traffic balancing through the 3-stage subnetwork 1200 of FIG. 11. Thus, the total address necessary for routing through subnetwork 1200 is 3+2+2, or 7 bits. With no failures, an address that routes through the spare center stage node is not used. If a node 1000 on the output side of network 1300 of FIG. 9 fails, it is desired to move communications to the next node 1000 on the output side of subnetwork 1200. Two things must happen. One, the 4-bit address used by the last two stages of FIG. 11 is incremented if this address is greater than or equal to the address of the failed node. This conforms to the shifting algorithm as defined above. Two, the three bit address used by the first stage of FIG. 11 need be modified using the following algorithm. If the 4-bit address used by the last two stages of FIG. 11 is greater than or equal to the address of the failed node and the two bit address used by the third stage of FIG. 11 is equal to the address of the last node output, then the 3-bit address used by the first stage of FIG. 11 is assigned the address of the last node output (which leads to the fifth, the spare, center stage node 1000).

Figure 12:
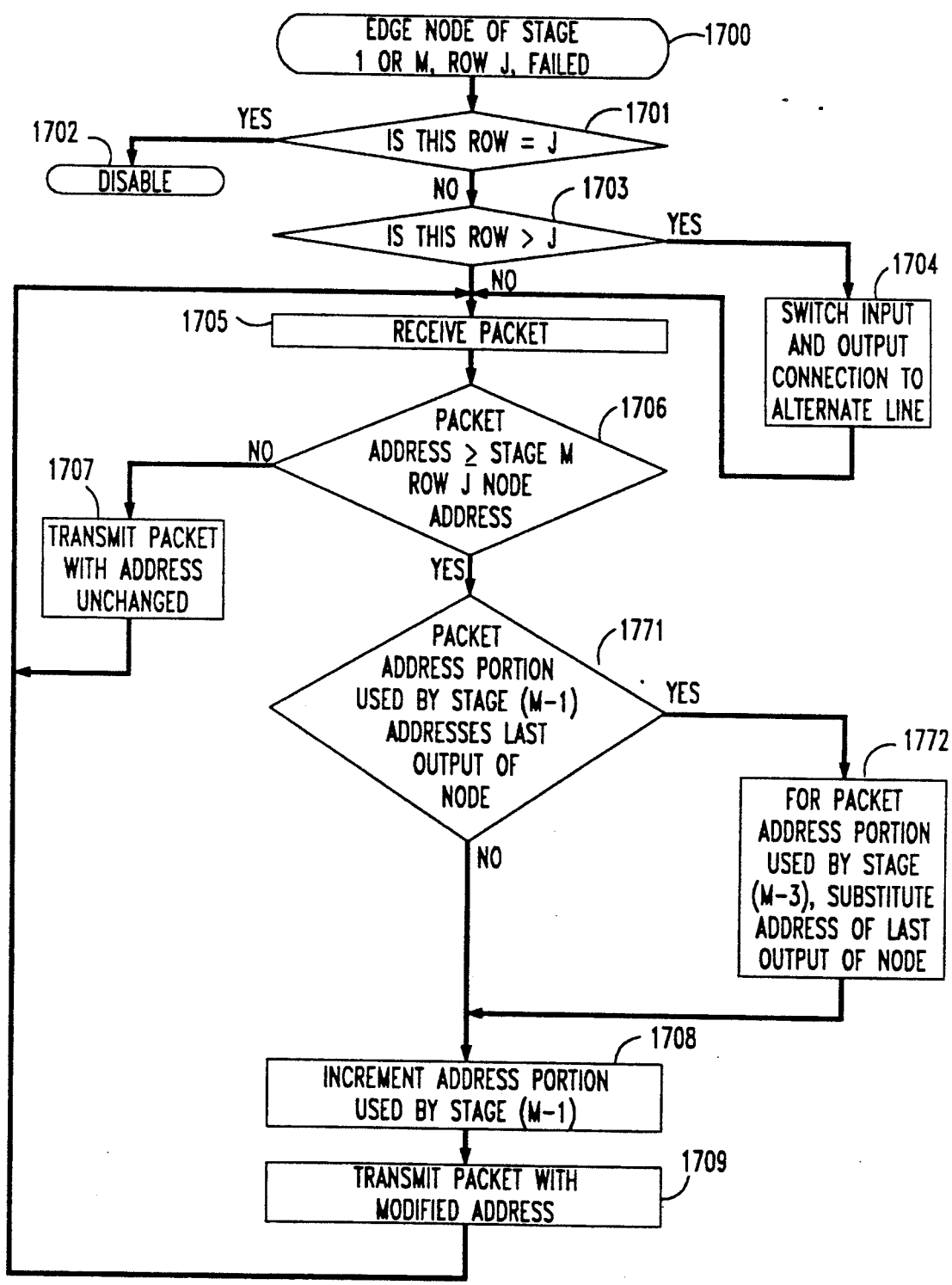
FIG. 12 shows in flow form the functions performed upon failure of an edge node of the system of combined FIGS. 9 and 11.

A generalization of the response to failure of an edge node of a system combining FIGS. 9 and 11 into any size network is shown in FIG. 12. A comparison of FIGS. 7 and 12 will show that FIG. 12 closely parallels FIG. 7: steps 1700-1709 of FIG. 12 correspond to steps 700-1709 of FIG. 7 but with the designation of the last stage having been changed from 3 to M. However, steps 1771 and 1772 are unique to FIG. 12, and represent the second, address-modifying, algorithm that has just been discussed: following an affirmative response in step 1706, the packet address portion that is used by a node of the next-to-last stage—the last stage of the subnetwork of FIG. 11—is examined at step 1771 to determine if it addresses the last output of that node, and if so, the packet address portion used by a node of stage (M-3)—the first stage of the subnetwork of FIG. 11—is changed at step 1772 to address the last output of that node, which output is connected to the last, spare, node of the center stage of the subnetwork of FIG. 11. Following steps 1771 and 1772, packet address incrementation proceeds as in FIG. 7.

Without this 3-bit address substitution, address incrementation of the 4-bit address would merely result in the center-stage node attempting to move the communication from an input of a next-stage node of row (r) to an input of a next-stage node of row (r+1), thereby potentially creating a conflict with some other communication being switched from that center-stage node to that next-stage node of row (r+1). But the effect of the address substitution algorithm is to cause the FIG. 11 first-stage node to move the communication from an input of one of the first four nodes of the center stage to an input of the fifth, normally-unused, node of the center stage, knowing that it has an unused link to each node of the next-stage nodes. Hence, the fifth center stage node can always switch the communication to the next-stage node of row (r+1) without any conflict.

Of course, it should be understood that various changes and modifications may be made to the above-described illustrative embodiment of the invention. For example, as node of size [a×b] and having an unused input or output may be replaced with a node of size [(a−1)×b] or [a×(b−1)], respectively, and vice versa. Or failure of a line circuit may be treated identically as a failure of an edge-stage node of the same row. Or, if only line-circuit sparing, and not node sparing, is desired, the spare row (N+1) may be eliminated, and instead spare line circuits may be connected to the (N+1)th edge inputs and outputs of nodes, and sequential line circuits in each row may have their pairs of inputs and outputs connected to the line which they normally serve and to the line normally served by the immediately-preceding line circuit. Then, upon failure of a line circuit in a row, line circuits of other rows continue to serve the line which they normally serve, all line circuits in the same row as the failed line circuit but preceding the failed one continue to serve the line which they normally serve, and all line circuits in the same row as the failed line circuit but succeeding the failed one switch to serving the line normally served by the preceding line circuit. All line circuits in the system check addresses of incoming packets to determine if they will be routed to the failed line circuit or to a line circuit below the failed one and in the same row as the failed one; if so, the line circuits increment the address to cause the packet to be routed instead to the next succeeding line circuit. Also, the spare row or line circuit need not be the last row or line circuit, but may occupy some other (e.g., first) position in the sequence of rows or line circuits. Furthermore, the concept of the illustratively-disclosed N+1 sparing strategy is easily extended to an N+K sparing strategy, by providing more rows of spare line circuits and nodes, increasing the number of alternative lines that a line circuit can select to serve, and cascading multiple copies of the additional, non-conventional, line circuit circuitry.

Figure 10:
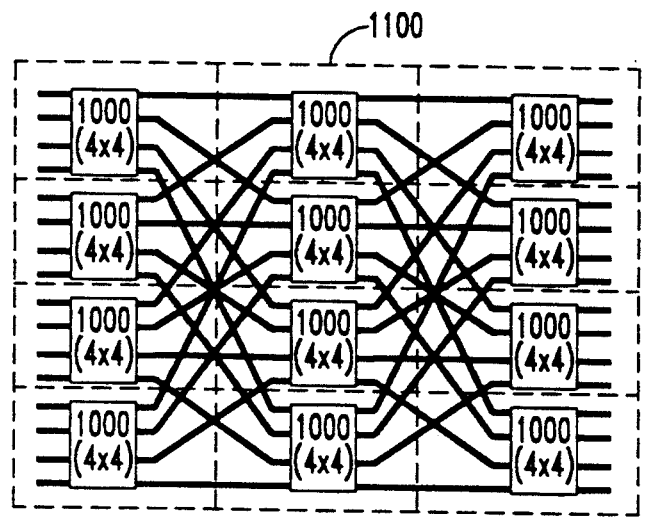
FIG. 10 is a block diagram of a first alternative implementation of a node of the center stage of the system of FIG. 9.

The invention is not limited to use with three-stage or five-stage Benes networks, but may be used with networks having any number of stages, e.g., a seven-stage or a nine-stage Benes network, or any desirable architecture, e.g., a Clos network. Specifically, the invention offers itself nicely for use in any non-blocking network, because it does not destroy its non-blocking nature. In a network having more than 3 stages, the amount of redundancy increases beyond N+1 (as illustrated by FIGS. 9 and 10). A Clos fabric is designed in a similar fashion as the Benes fabric, except that, in a Clos network, the nodes are not "square" (do not have the same number of inputs and outputs). Consequently, in networks having more than 3 stages, the number of rows is typically different from stage to stage. Nevertheless, the shifting strategy described above works fine for such networks, as long as P spare line circuits and P/M spare edge nodes are provided. A five-stage self-routing network requires two address comparisons, as opposed to the one required for the three-stage network (as illustrated by the discussion of FIGS. 9-12), while a seven-stage network requires three comparisons to be able to bypass a particular node, or subnetwork. Given that one has a choice in the size of nodes out of which the network is constructed (as illustrated in FIGS. 1-2 and 9-11), one can conveniently choose a node size that occupies a whole circuit board, but only one circuit board. In this manner, when a node fails and is bypassed, system repair is simple and involves only the replacement of the one failed board with a new board.

What's more, the invention is not limited in use to self-routing switches, but may be used with other types of switches, e.g., circuit switches, as well. However, a circuit switch does not interpret address bits in packets, so the add-1 scheme cannot be used for control. The control must be exercised directly on the crosspoints by a fabric controller. However, if the line circuit failure shifting strategy is employed in one direction on the line side of the line circuit and in the opposite direction on the fabric side of the line circuit, then an n+1 sparing strategy can be employed for line circuit failures, without exercising any new cross-point control. This might even be done in conjunction with a duplex fabric. Such changes and modifications may be made without departing from the spirit and the scope of the invention. It is therefore intended that such changes and modifications be covered by the following claims.

I claim:

1. A telecommunications system comprising:

a plurality of switching nodes interconnected to form switching stages and rows including a normally spare row of a switching matrix, the nodes for routing received telecommunications through the matrix; and first means in cooperative arrangement with the switching nodes and responsive to a signal identifying an individual node of an individual row other than the spare row, for re-routing telecommunications normally received by the individual node to a node both (a) of the same stage as the individual node and (b) not of the spare row, and for re-routing telecommunications, received without the re-routing by any node to which telecommunications are being re-routed, to a node of the same stage as the individual node, the re-routing including re-routing telecommunications, received without the re-routing by one of the nodes to which telecommunications are being re-routed, to a node of both the same stage as the individual node and of the spare row.

2. The system of claim 1 wherein the rows form a first sequence of rows of the switching matrix; and the first means include second means for re-routing the telecommunications, received without the re-routing by any one of (a) the identified individual node and (b) nodes other than the individual node of both (i) a same stage as the individual node and (ii) of rows on a same side of the individual row in the sequence as the spare row, to a node of both (a) the same stage as the individual node and (b) a row on the same side of the row that includes the one node.

3. The system of claim 2 wherein the second means re-route telecommunications, received without the re-routing by any one of (a) the individual node and (b) the nodes of both (i) a same stage as the individual node and (ii) of rows on the same side of the individual row in the sequence as the spare row, to a node of both (a) the same stage as the individual node and (b) a row adjacent in the sequence on the same side to the row that includes the one node.

4. The system of claim 2 wherein the plurality of switching nodes are interconnected to form internal and edge switching stages of the switching matrix; and the second means comprise means responsive to a signal identifying an individual node of an internal stage of an individual row other than the spare row, for re-routing telecommunications, received without the re-routing by any one of (a) the individual node and (b) nodes of both (i)the same stage as the individual node and (ii) rows on the same side of the individual row in the sequence as the spare row, to a node of both (a) the same stage as the individual node and (b) a row on the same side of the row that includes the one node, and means responsive to a signal identifying an individual node of an edge stage of an individual row other than the spare row, for re-routing telecommunications, received without the re-routing by any one of (a) nodes of the edge stages of the individual row and (b) nodes of the edge stages of rows on the same side of the individual row in the sequence as the spare row, to a node of both (a) the same edge stage as the one node and (b) a row on the same side of the row that includes the one node.

5. The switching system of claim 1 further comprising:

a plurality of line circuits connected to edge nodes of the rows, including to edge means of the spare row, the plurality of line circuits being included in the rows of the connected nodes, each for interfacing received telecommunications between a communication line and the connected nodes; and second means responsive to a signal identifying an individual line circuit of an individual row other than the spare row, for re-routing telecommunications, received without the re-routing by the individual line circuit, to another line circuit not of the spare row, and for re-routing telecommunications, received without the re-routing by any line circuit to which telecommunications are being re-routed, to another line circuit, the re-routing including re-routing telecommunications, received without the re-routing by one of the line circuits to which telecommunications are being re-routed, to a line circuit of the spare row.

6. The system of claim 5 wherein the second means re-route telecommunications, received without the re-routing by the individual line circuit, to another line circuit of a row other than the individual row and other than the spare row, and re-route telecommunications, received without the re-routing by any line circuit to which telecommunications are being re-routed, to another line circuit of a row other than the row which includes said any line circuit.

7. The system of claim 6 wherein the line circuits included in each row form a sequence of line circuits of each row; and the second means re-route telecommunications, received without the re-routing by the individual line circuit, to another line circuit corresponding to the individual line circuit in the sequence, the other line circuit being included in a row other than the spare row, and re-route telecommunications, received without the re-routing by any line circuit to which telecommunications are being re-routed, to another line circuit corresponding to the individual line circuit in the sequence.

8. The system of claim 6 wherein the rows form a first sequence of rows of the switching matrix;

the line circuits included in each row form a second sequence of line circuits of each row; and the second means include third means for re-routing telecommunications, received without re-routing by any one of (a) the individual line circuit of the individual row and (b) line circuits corresponding to the individual line circuit in the second sequence and included in rows on the same side of the individual row in the first sequence as the spare row, to the line circuit corresponding to the individual line circuit in the second sequence and included in a row adjacent in the first sequence on the same side to the row that includes the one line circuit.

9. The system of claim 2 wherein the plurality of switching nodes are interconnected to form internal and edge switching stages of the switching matrix;

the system further comprises a plurality of line circuits connected to edge nodes of the rows, including to edge nodes of the spare row, the plurality of line circuits being included in the rows of the connected nodes, each for interfacing received telecommunications between a communication line and the connected nodes;

the second means comprise means responsive to a signal identifying an individual node of an internal stage of an individual row other than the spare row, for re-routing telecommunications, received without the re-routing by any one of (a) the individual node and (b) nodes of both a same stage as the individual node and rows on the same side of the individual row in the sequence as the spare row, to a node of both (a) the same stage as the individual node and (b) a row adjacent in the sequence on the same side to the row that includes the one node, and means responsive to a signal identifying an individual node of an edge stage of an individual row other than the spare row, for re-routing telecommunications, received without the re-routing by any one of (a) line circuits of the individual row and (b) line circuits of rows on the same side of the individual row in the sequence as the spare row, to line circuits of a row adjacent in the sequence on the same side to the row that includes the one node.

10. The system of claim 9 wherein a plurality of the line circuits is connected to edge nodes of each of the rows, including to edge nodes of the spare row, the plurality of line circuits that are connected to an individual node being included in the row of the connected individual node, each for interfacing received telecommunications between a communication line and the connected nodes, the line circuits which are included in each row forming a second sequence of line circuits of each row; and the second means further comprise means responsive to a signal identifying an individual line circuit of an individual row other than the spare row, for re-routing telecommunications, received without the re-routing by any one of (a) the individual line circuit of the individual row and (b) line circuits corresponding to the individual line circuit in the second sequence and included in rows on the same side of the individual row in the first sequence as the spare row, to the line circuit corresponding to the individual line circuit in the second sequence and included in a row adjacent in the first sequence on the same side to the row that includes the one line circuit.

11. The system of claim 1 wherein the switching matrix is a self-routing packet switching matrix, the nodes are for routing received packets on a basis of routing addresses included with the packets, and the first means re-route packets by modifying the addresses of the packets prior to the nodes receiving the packets.

12. The system of claim 5 wherein the switching matrix is a self-routing packet switching matrix;

the nodes are for routing received packets on a basis of routing addresses included with the packets;

the line circuits of each row selectively serve existing ones of (a) first communication lines served without the re-routing by the line circuits of the row and (b) second communication lines served without the re-routing by the line circuits of a row adjacent in the sequence to the row on a side other than the same side; and the second means re-route packets by (a) causing first selected line circuits to cease serving the first communication lines and causing second selected line circuits to serve the second communication lines and (b) modifying the addresses of the packets prior to the nodes receiving the packets.

13. In a line circuit for interfacing telecommunications packets having routing addresses, between a telecommunications line and a telecommunications switch, the improvement comprising:

first means for receiving an address indicative of a switching element which a received packet is to avoid;

second means connected to the first means for comparing an address received by the first means with a routing address of a received packet; and third means connected to the second means for modifying the routing address of the received packet to re-route the packet through the switch, when the comparison indicates a predetermined relationship between the compared addresses.

14. The improvement of claim 13 further comprising:

fourth means connected to the second means for selectively receiving packets from one of a pair of telecommunications lines, one of the lines being served without the re-routing by the line circuit and the other of the lines being served without the re-routing by another line circuit.

15. The improvement of claim 14 further comprising:

fifth means for receiving packets that have been routed through the switch and selectively transmitting the received routed packets to the one of the pair of the telecommunications lines.

16. In a line circuit for interfacing telecommunications packets that have routing addresses, between a telecommunications line and a telecommunications switch having a plurality of switching stages each using a different portion of the routing address to route the packet through the switch, the improvement comprising:

first means for receiving an address and an identifier of an address portion indicative of a switch element around which a received packet is to be routed;

second means connected to the first means for comparing an address received by the first means with a routing address of a received packet; and third means connected to the first and the second means for modifying a portion of the routing address of the received packet identified by the identifier received by the first means, to cause a switching stage that uses the modified address portion to reroute the packet through the switch, when the comparison indicates that the routing address included in the received packet is either equal to, or in a sequence of routing addresses lies to one side of, the address received by the first means.

17. The improvement of claim 16 further comprising:

fourth means connected to the second means for receiving packets selectively from one of (a) a first telecommunications line interfaced without the re-routing with the telecommunications switch by the line circuit and (b) a second telecommunications line interfaced without the re-routing with the telecommunications switch by another line circuit, and providing the received packets to the second and the third means.

18. The improvement of claim 16 further comprising:

fifth means for receiving packets that have been routed through the telecommunications switch and transmitting the received routed packets selectively on the one of (a) the first telecommunications line and (b) the second telecommunications line.

19. A telecommunications switching system employing an "N+K"-type of sparing strategy wherein N is an integer greater than one and K is an integer at least equal to one, comprising:

a plurality of switching nodes interconnected to form switching stages and a sequence of rows including a sequentially-last row of a switching matrix, the sequentially-last row being a spare row in an absence of failure of one of the switching nodes, the nodes for routing received telecommunications through the matrix; and means in cooperative arrangement with the switching nodes and responsive to failure of one of the switching nodes of a row other than the spare row, for causing telecommunications that are received in an absence of the failure (a) by the failed node and (b) by nodes that are both in a same stage as the failed node and in rows sequentially-subsequent to the row that includes the failed node, each to be instead received by a node that is both in the same stage as the failed node and in a row sequentially-subsequent to the row that includes the node that receives the telecommunication in the absence of the failure.

20. The switching system of claim 19 further comprising:

a plurality of line circuits connected to first nodes of the rows, including to nodes of the spare row, the plurality of line circuits being included in the rows of the connected nodes, each for interfacing received telecommunications between a communication line and the connected first nodes; and wherein the causing means include first means responsive to a failure of one of the first nodes of a row other than the spare row, for causing telecommunications that are received in an absence of the failure (a) by line circuits and first nodes of a row that includes the failed first node and (b) by line circuits and first nodes of rows that are sequentially-subsequent to the row that includes the failed first node, each to be instead received by a line circuit and a first node of a row sequentially-subsequent to the row that includes the line circuit and the first nodes that receive the telecommunication in the absence of the failure.

21. The switching system of claim 19 further comprising:

a plurality of line circuits connected to nodes of the rows, including to nodes of the spare row, the plurality of line circuits being included in the rows of the connected nodes, each for interfacing received telecommunications between a communication line and the connected first nodes; and wherein the causing means include first means responsive to failure of one of the line circuits of a row other than the spare row, for causing telecommunications that are received in the absence of the failure (a) by the failed line circuit and (b) by a line circuit of each one of rows that are sequentially-subsequent to the row that includes the failed line circuit, each to be instead received by a line circuit of a row sequentially-subsequent to the row that includes the line circuit that receives the telecommunication in the absence of the failure.

22. The system of claim 19 wherein the plurality of switching nodes are interconnected to form a sequence of internal and edge switching stages of the switching matrix; and the causing means include first means responsive to failure of one of the switching nodes of an internal stage of a row other than the spare row, for causing telecommunications that are received in the absence of the failure (a) by the failed node and (b) by nodes that are both in a same stage as the failed node and in rows sequentially-subsequent to the row that includes the failed node, each to be instead routed, by nodes of a stage that sequentially precedes the stage that includes the failed node, for receipt to a node that is both in the same stage as the failed node and in a row sequentially-subsequent to the row that includes the node that receives the telecommunication in the absence of the failure.

23. The system of claim 22 further comprising a plurality of line circuits connected to nodes of the edge stages of rows, including to nodes of the spare row, the plurality of line circuits being included in the rows of the connected nodes, each for interfacing received telecommunications between a communication line and the connected nodes; and wherein the causing means include second means responsive to failure of one of the switching nodes of an edge stage of a row other than the spare row, for causing telecommunications that are received in the absence of the failure (a) by line circuits of a row that includes the failed node and (b) by line circuits of rows that are sequentially-subsequent to the row that includes the failed node, each to be instead received by a line circuit of a row sequentially-subsequent to the row that includes the line circuit that receives the telecommunication in the absence of the failure; and the first means are responsive to the failure of the one of the switching nodes of an edge stage, for causing telecommunications that are received in the absence of the failure (a) by a node of an edge stage of the row that includes the failed node and (b) by nodes of an edge stage of rows sequentially-subsequent to the row that includes the failed node, each to be instead routed, by nodes of a stage that sequentially precedes an edge stage, for receipt to a node that is both in an edge stage and in a row sequentially subsequent to the row that includes the node that receives the telecommunication in the absence of the failure.

24. The system of claim 23 wherein the second means are responsive to failure of a line circuit of a row other than the spare row, for causing telecommunications that are received in the absence of the failure (a) by the failed line circuit and (b) by a line circuit of each one of rows that are sequentially-subsequent to the row that includes the failed line circuit, each to be instead received by a line circuit of a row sequentially-subsequent to the row that includes the line circuit that receives the telecommunication in the absence of the failure, and the first means are responsive to the failure of the line circuit, for causing telecommunications that are received in the absence of the failure (a) by the failed line circuit and (b) by the line circuit of each one of the rows that are sequentially-subsequent to the row that includes the failed line circuit, each to be instead routed, by nodes of a stage that sequentially precedes an edge stage, for receipt to a node of the edge stage that is in a row sequentially-subsequent to the row that includes the line circuit that receives the telecommunication in the absence of the failure.

25. In a self-routing packet telecommunications switching system having a plurality of first switching nodes interconnected to form a sequence of first rows and internal and edge stages of a switching matrix for routing received packets through the matrix by using addresses included with the received packets and the nodes of each different stage using a different portion of the addresses, and a plurality of first line circuits connected to first nodes of the edge switching stages and included in the rows of the first nodes to which they are connected each for normally interfacing a first telecommunication line to the first nodes, the improvement comprising:

second switching nodes interconnected with each other to form a second row of the matrix and further interconnected with the first nodes and included in the switching stages, the second switching nodes being spare switching nodes for the first switching nodes; and the first line circuits each including first means for receiving and storing a first address identifying one of a first node and a first line circuit around which received packets are to be routed, second means connected to the first means, for comparing the first address with a routing address included with a packet received by the line circuit, and third means connected to the second means, for incrementing a portion of the routing address included with the received packet when the second means determine that the first address is equal to or smaller than the routing address included with the received packet, to cause the first and the second nodes to reroute the received packet around the one of the first node and the first line circuit identified by the first address.

26. The improvement of claim 25 further comprising:

second line circuits connected to the second nodes and included in the second row, the second line circuits being spare line circuits for the first line circuits, each for selectively interfacing to the second nodes a second line that is the first line of a corresponding first line circuit of a first row that is last in the sequence, each second line circuit including the first, the second, and the third means; and the first line circuits of all but a first row that is first in the sequence each for selectively interfacing the first nodes of its row to one of the first telecommunication line and a second telecommunication line that is the first telecommunication line of a corresponding first line circuit of a first row that precedes its row in the sequence.

27. The improvement of claim 26 wherein:

each of the first line circuits continues to interface the first telecommunication line when the first means receive an address of an internal first node;

each of the first line circuits in a first row that includes a first node identified by an address received by the first means becomes disabled when the first means receive an address of an edge first node;

each of the first and the second line circuits in every row that sequentially succeeds the first row that includes the first node identified by the address received by the first means commences to interface the second telecommunication line when the first means receive the address of the edge first node; and each of the first line circuits in every first row that sequentially precedes the first row that includes the first node identified by the address received by the first means continues to interface the first telecommunication line when the first means receive the address of the edge first node.

28. The improvement of claim 27 wherein:

a first one line circuit identified by an address received by the first means becomes disabled when the first means receive the address of the one line circuit;

each of the first and the second line circuits that are both (a) in a row that sequentially succeeds the first row that includes identified one line circuit and (b) that are corresponding line circuits to the identified one line circuit and to each other, commences to interface the second telecommunication line when the first means receive the address of the one line circuit; and each of the first line circuits that are in a row that sequentially precedes the first row that includes the identified one line circuit and each of the first line circuits that are both (a) in a row that sequentially succeeds the first row that includes the identified one line circuit and (b) that are not corresponding line circuits to the identified one line circuit, continues to interface the first telecommunication line when the first means receive the address of the first one line circuit.

29. The system of claim 1 wherein the plurality of switching nodes are interconnected to form a plurality of switching stages and rows.

30. The line circuit of claim 13 for interfacing the telecommunications packets, having addresses for routing the packets through a plurality of switching stages of a telecommunications switch, between the line and the telecommunications switch having a plurality of the switching stages.

31. The system of claim 19 wherein the plurality of switching nodes are interconnected to form a plurality of switching stages and a sequence of rows.

32. The improvement of claim 14 in a line circuit for interfacing telecommunications packets having virtual routing addresses, further comprising fifth means for translating virtual routing addresses of packets received from the one of the lines into real routing addresses, and sixth means for replicating a translation function performed by the other line circuit without the re-routing, by translating virtual routing addresses of packets received from the other of the lines into real routing addresses; and wherein the second means are connected to the fifth and the sixth means and compare the routing address received by the first means with a real routing address generated by selectively either the fifth means or the sixth means.

33. The improvement of claim 32 wherein without the re-routing the second means compare the routing address received by the first means with real routing addresses generated by the fifth means, and in a presence of the re-routing the second means compare the routing address received by the first means with real routing addresses generated by the sixth means.

34. The improvement of claim 32 wherein the fourth means include controllable means cooperative with the fifth and the sixth means, for coupling the packets received from the one of the lines to the fifth means and blocking the packets received from the other of the lines from reaching the sixth means in an absence of a control signal, and for coupling the packets received from the other of the lines to the sixth means and blocking the packets received from the one of the lines from reaching the fifth means in a presence of the control signal.

35. The improvement of claim 32 wherein the sixth means include means for storing information for translating the virtual routing addresses of the packets received from the other of the lines into the real routing addresses, which information duplicates information stored and used by the other line circuit for translating the virtual routing addresses of the packets received by the other line circuit from the other of the lines into the real routing addresses.

36. The improvement of claim 14 in a line circuit for interfacing telecommunications packets having virtual routing addresses, further comprising:

means for translating virtual routing addresses of received packets into real routing addresses and including addressable memory means having a first addressable partition for storing information for translating virtual routing addresses of packets received from the one of the lines into real routing addresses, the first partition being addressable by addresses comprising a first value of a control signal and the virtual routing addresses of received packets, and a second addressable partition for storing information which duplicates information stored and used by the other line circuit for translating virtual routing addresses of packets received from the other of the lines into real routing addresses, the second partition being addressable by addresses comprising a second value of the control signal and the virtual routing addresses of received packets; wherein the second means are connected to the translating means and compare the routing address received by the first means with real routing addresses generated by the translating means, and the fourth means include controllable means connected to the translating means for coupling the virtual addresses of packets received from the one of the lines to the translating means and blocking the packets received from the other of the lines from the second means while the control signal has the first value, and for coupling the virtual addresses of packets received from the other of the lines to the translating means and blocking the packets received from the one of the lines from the second means, while the control signal has the second value.

* * * * *

UNITED STATES PATENT AND TRADEMARK OFFICE
CERTIFICATE OF CORRECTION

PATENT NO. : 5,229,990

DATED : July 20, 1993

INVENTOR(S) : Kari T. Teraslinna

It is certified that error appears in the above-identified patent and that said Letters Patent is hereby corrected as shown below:

Column 15, line 6, "means" should read --nodes--.

Signed and Sealed this

Twenty-first Day of January, 1997

Attest:

BRUCE LEHMAN

Attesting Officer

Commissioner of Patents and Trademarks